United States Patent [19]

Elmer et al.

[11] Patent Number: 4,619,340
[45] Date of Patent: Oct. 28, 1986

[54] HIGH CLEARANCE SELF-PROPELLED VEHICLE WITH VARIABLE CLEARANCE AND VARIABLE WHEEL SPACING

[76] Inventors: Willard O. Elmer, Indianola, Nebr. 69034; Edgar J. Rickel, 8109 El Monte, Shawnee Mission, Kans. 66208

[21] Appl. No.: 691,503

[22] Filed: Jan. 14, 1985

[51] Int. Cl.⁴ .............................. B60P 3/00
[52] U.S. Cl. .................... 180/209; 172/413; 180/900; 280/91; 280/103; 414/460
[58] Field of Search ........... 180/209, 906, 900; 280/91, 99, 103, 104; 414/459, 460, 461; 172/413, 476, 673

[56] References Cited

U.S. PATENT DOCUMENTS

| | | | |
|---|---|---|---|
| 2,634,663 | 4/1953 | Curtis | 172/476 X |
| 3,154,164 | 10/1964 | Shaw et al. | 180/209 |
| 3,179,194 | 4/1965 | Hunt | 180/72 |
| 3,184,087 | 5/1965 | Prindle et al. | 414/459 |
| 3,217,823 | 11/1965 | Balthes | 180/209 X |
| 3,236,324 | 2/1966 | Levratto | 180/234 |
| 3,570,695 | 3/1971 | Schwartz | 414/460 |
| 3,677,572 | 7/1972 | Fontan et al. | 414/459 X |
| 3,964,565 | 6/1976 | Cagle et al. | 180/70.1 |
| 4,029,165 | 6/1977 | Miller et al. | 180/6.48 |
| 4,159,778 | 7/1979 | Peuschner et al. | 414/460 |
| 4,269,560 | 5/1981 | Thomas | 414/459 |
| 4,275,982 | 6/1981 | Fisco | 414/459 |
| 4,432,690 | 2/1984 | Monk | 414/460 |
| 4,451,054 | 5/1984 | Allison | 280/104 |
| 4,506,609 | 3/1985 | Fuss et al. | 172/413 X |

FOREIGN PATENT DOCUMENTS 2485451 12/1981 France ................ 414/460

Primary Examiner—John J. Love
Assistant Examiner—Charles R. Watts
Attorney, Agent, or Firm—Fields, Lewis, Pittenger & Rost

[57] ABSTRACT

A vehicle has a frame (2), wheel assemblies (3) connected to the frame, and a lateral support assembly (4) connected between each of the front wheel assemblies and the rear wheel assemblies. Each wheel assembly is pivotally connected by an upper pivot member (92) to an upright post (24). A collar (85) is slidable up and down on each post. Bracing hydraulic cylinders (115) connect between the support assembly and the wheel assemblies. A control circuit for the cylinders (115) with a control valve (177) maintains the wheel assemblies upright. Elevator hydraulic cylinders (127) transmit the weight of the frame to the wheels. A control circuit with position control valves (153) automatically adjusts the elevator hydraulic cylinders (127) to hold the frame at a preset elevation and a control circuit with position control valves (171) automatically adjusts the wheel spacing hydraulic cylinders (166) to hold the wheels at a preset spacing. A control circuit regulates the speed and direction of hydrostatic motors (182) on the wheels and the turning of the wheels.

25 Claims, 18 Drawing Figures

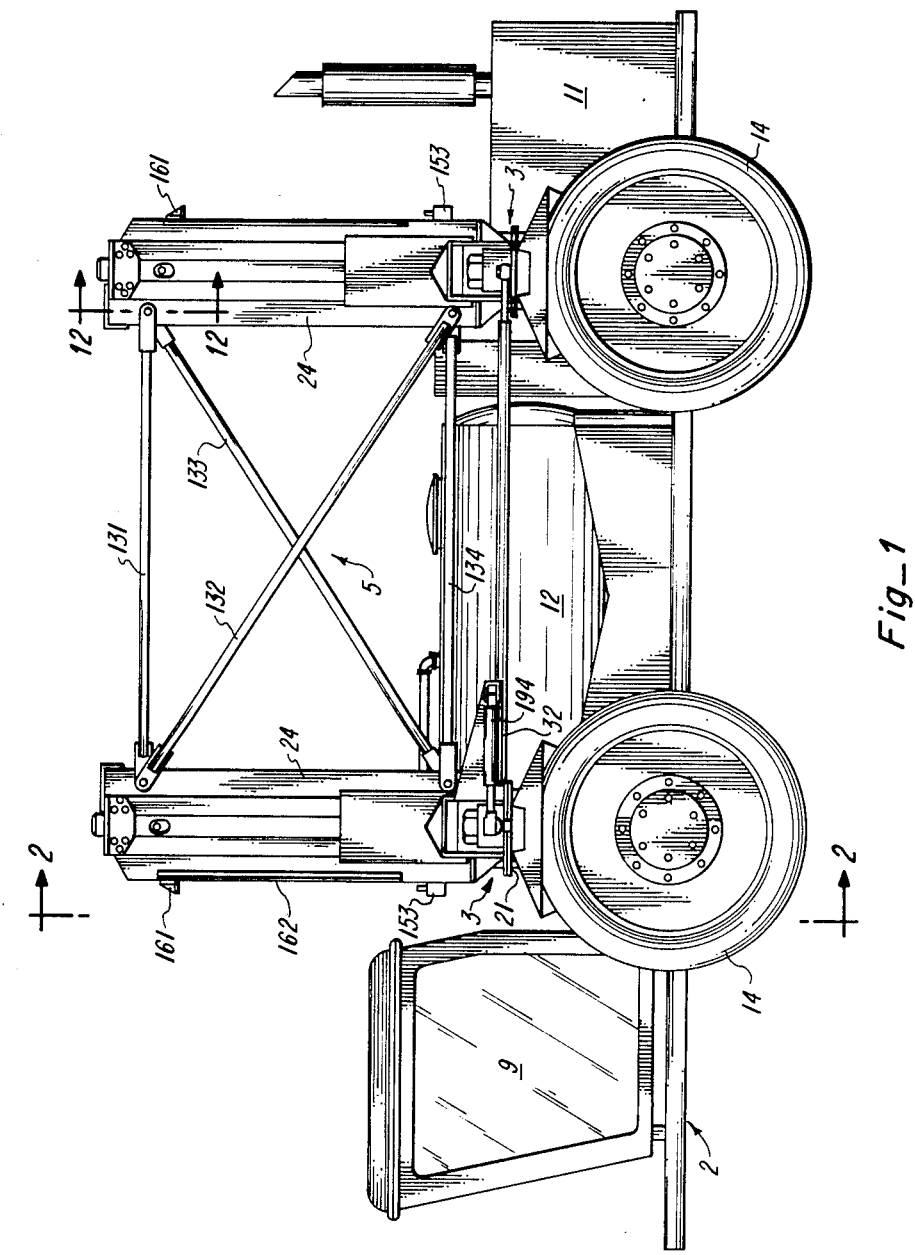
Fig_1

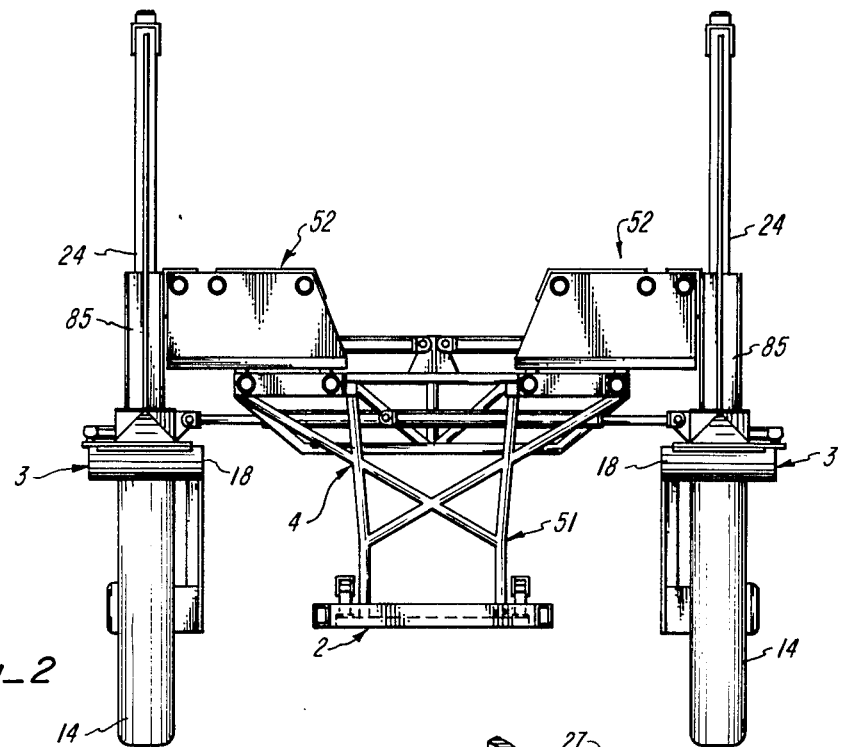
Fig_2
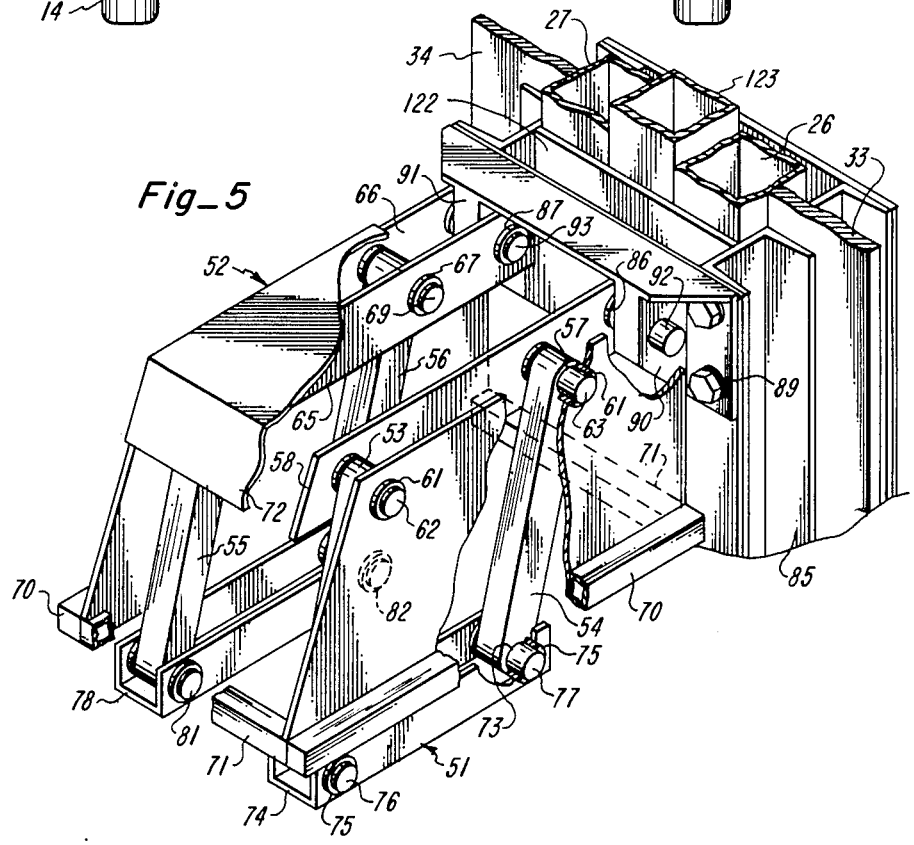
Fig_5

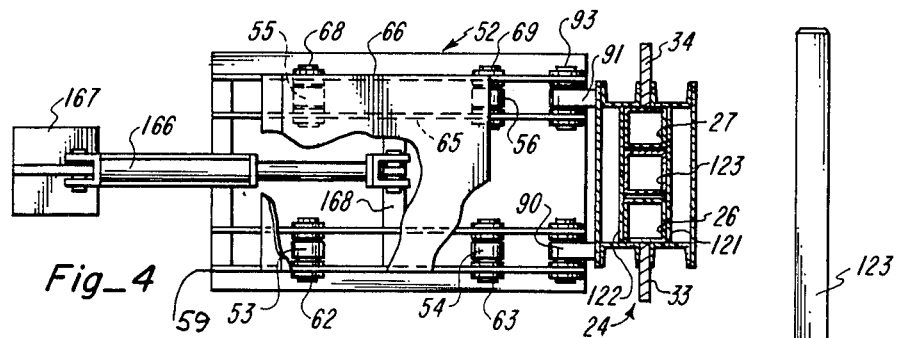
Fig_4
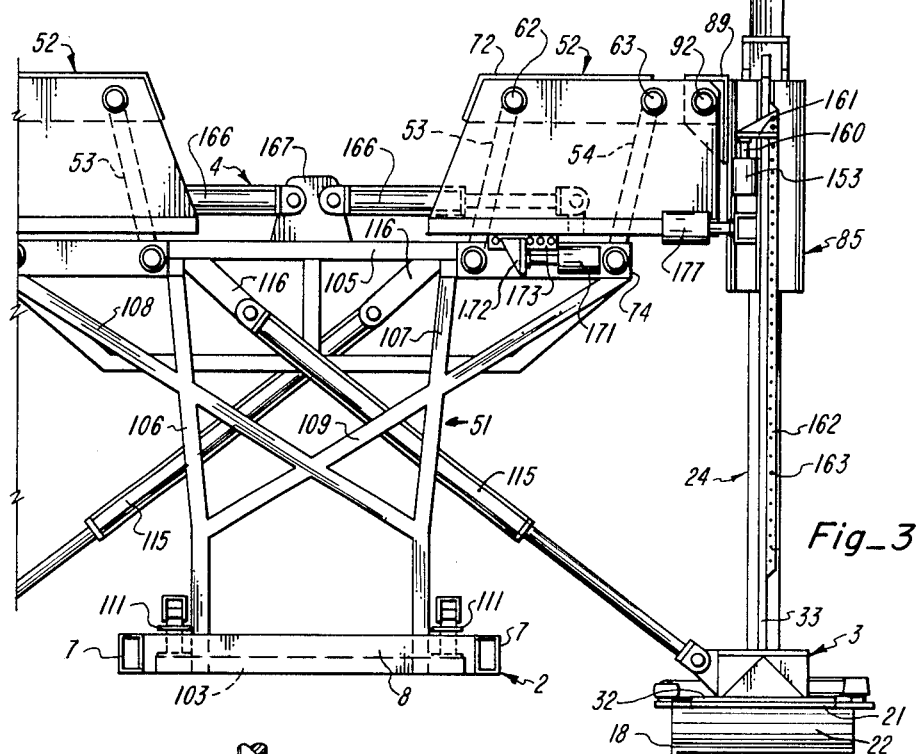
Fig_3
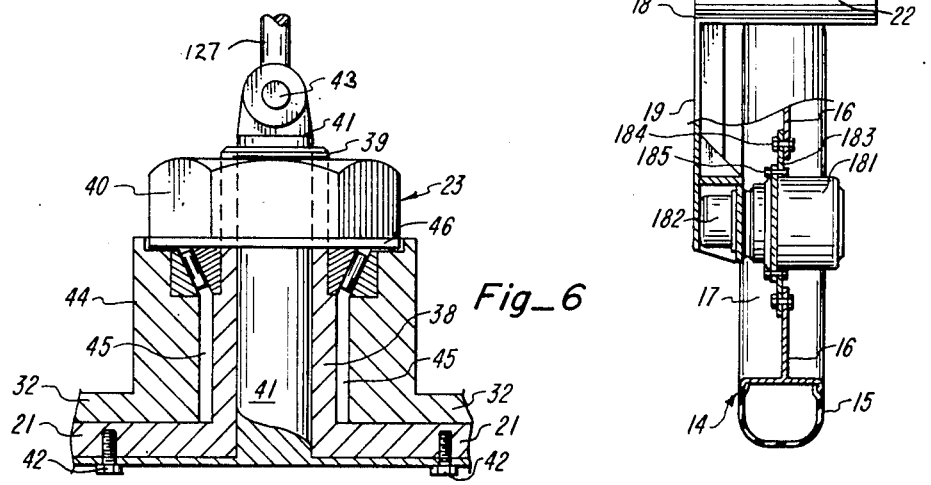
Fig_6

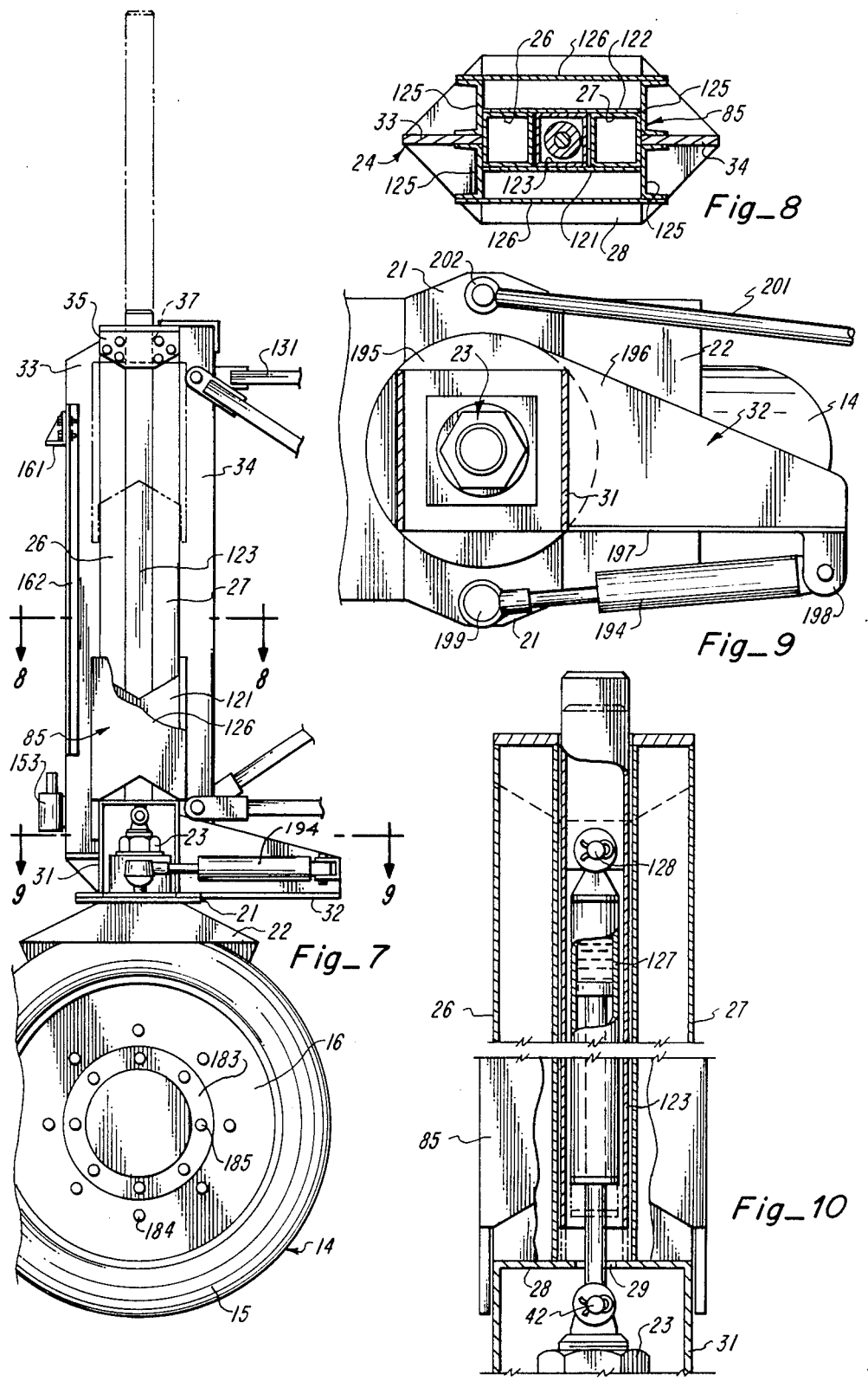

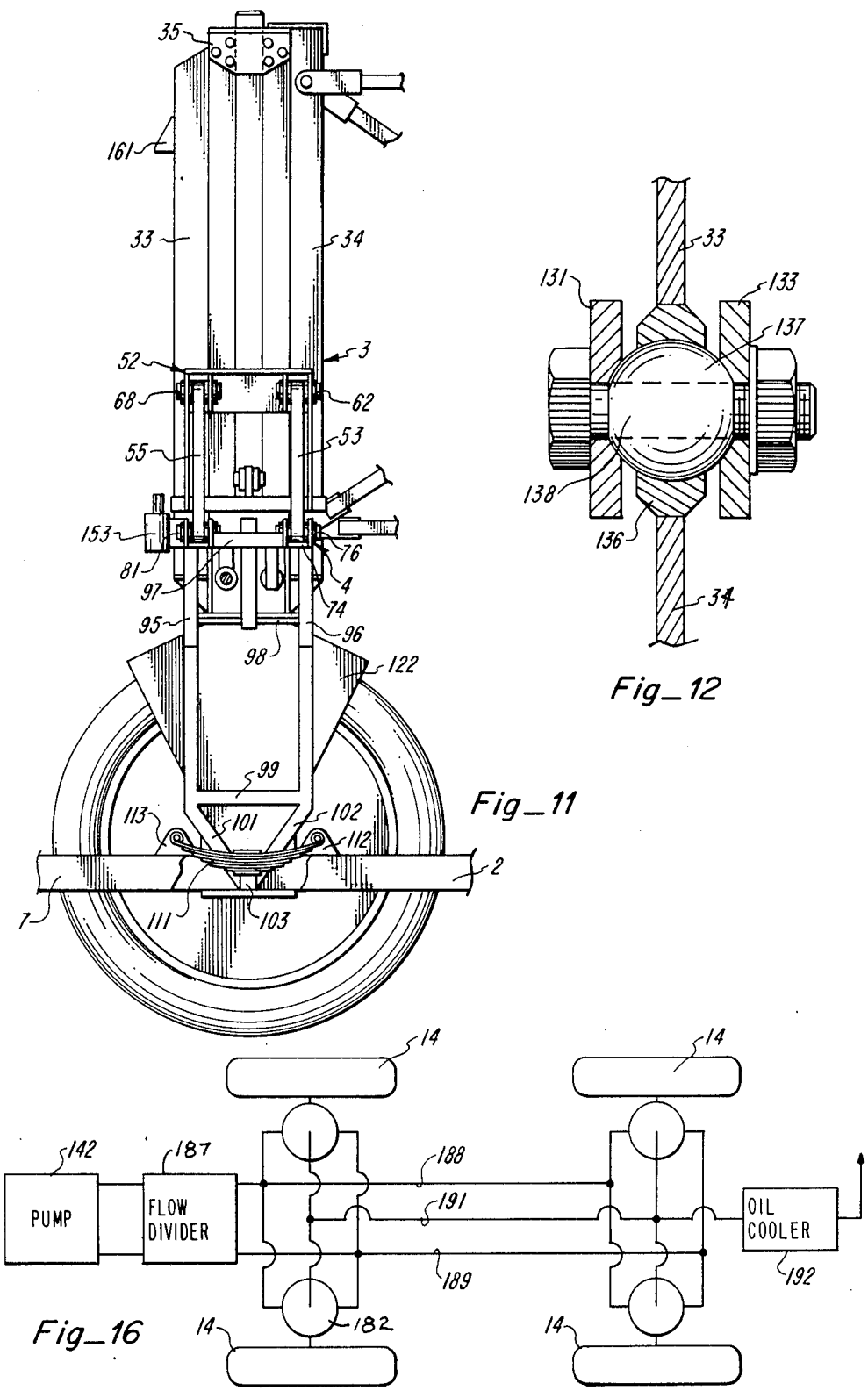

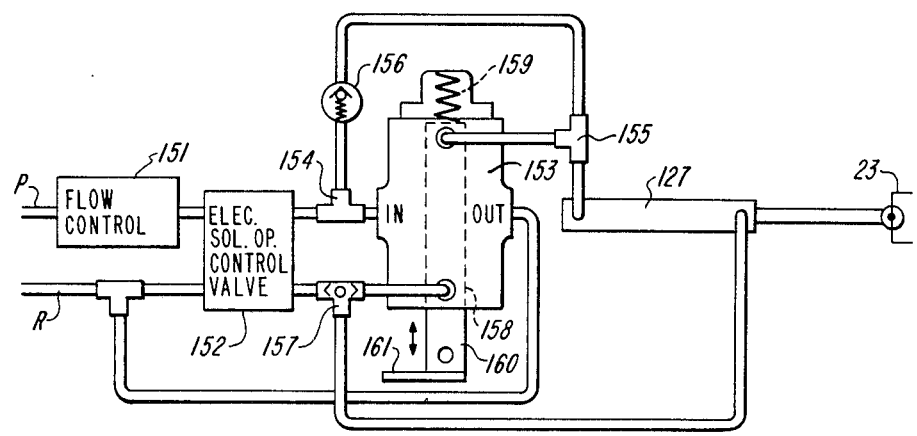
*Fig_14*
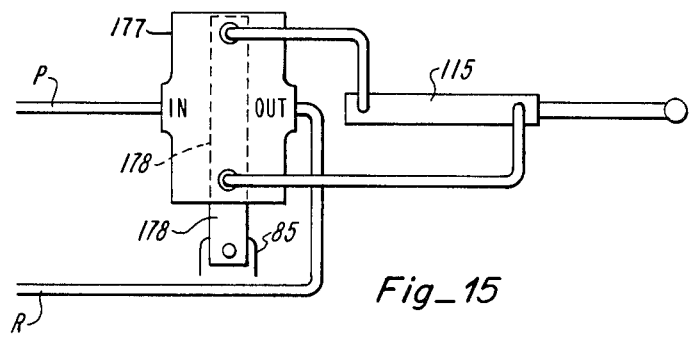
*Fig_15*
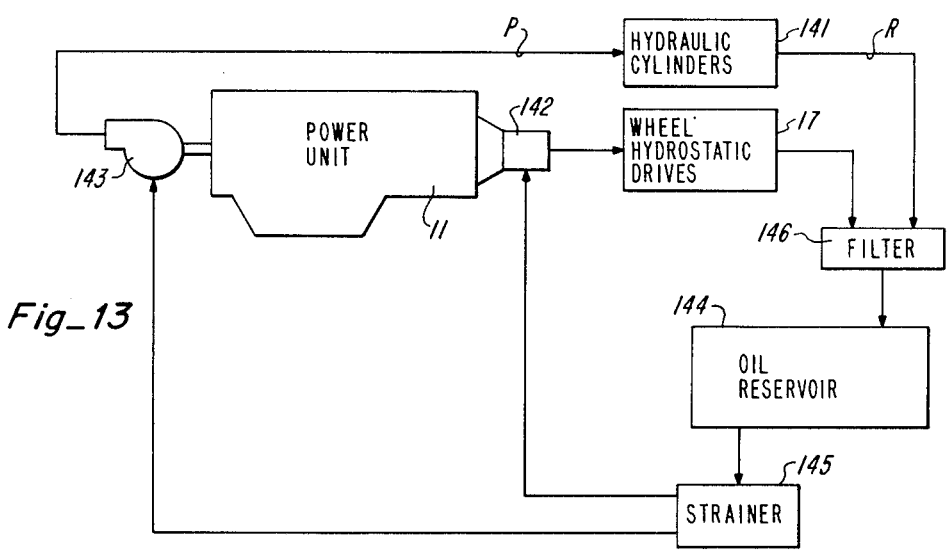
*Fig_13*

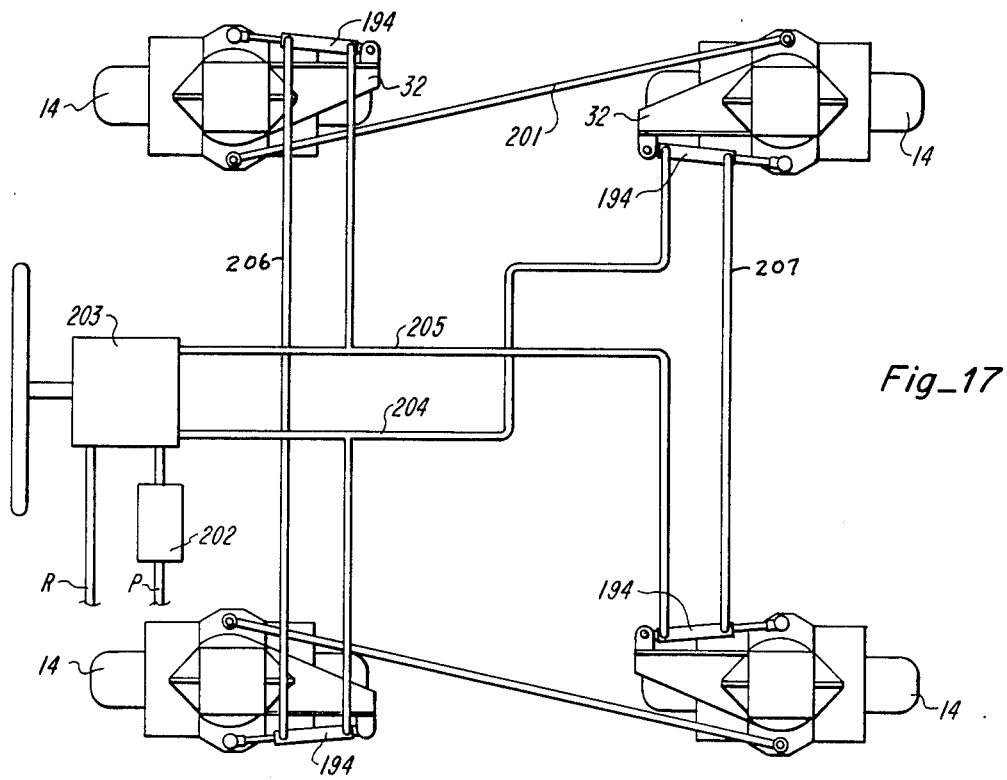
Fig_17
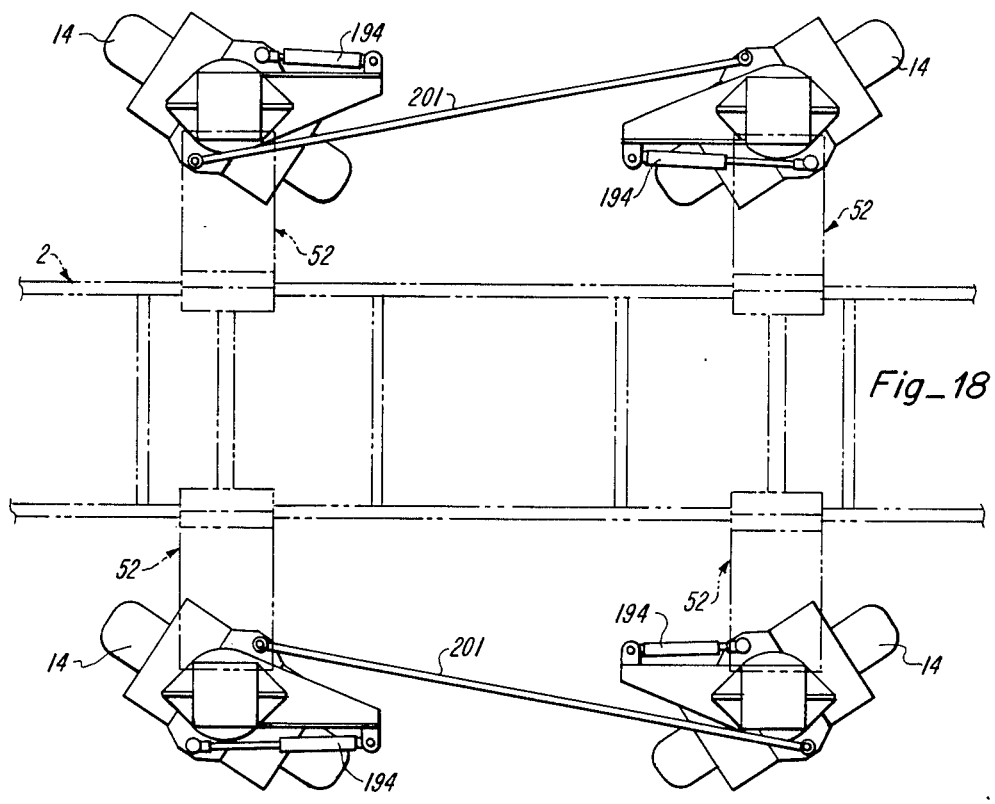
Fig_18

HIGH CLEARANCE SELF-PROPELLED VEHICLE WITH VARIABLE CLEARANCE AND VARIABLE WHEEL SPACING

TECHNICAL FIELD

This invention relates to a novel and improved highly versatile self-propelled vehicle.

BACKGROUND ART

Vehicles have been developed heretofore wherein the frame may be raised and lowered and wherein the spacing between wheels may be adjusted. Vehicles of this type have been used for material handling, as tool carriers, crop sprayers, and to apply fertilizers. For agricultural purposes such vehicles proceed along a row of crops with the wheels straddling the plants so as to pass between the rows. In the past a single vehicle had deficiencies with respect to the range of varying the clearance and wheel spacing and the larger vehicles have generally lacked durability. In general, prior known vehicles of this type have not been entirely satisfactory for all types of requirements.

High clearance vehicles such as those disclosed in U.S. Pat. Nos. 3,179,194, Hunt, 3,236,324, Levratto, and 3,964,565, Cagle et al., connect the frame directly to the wheel assemblies and by so doing limit the minimum clearance for the frame.

Clearance variations for a vehicle frame disclosed in U.S. Pat. No. 4,029,165, Miller et al., are provided by the use of a ram contained in telescoping cylinders with an outer cylinder connected directly to the frame and the inner cylinder connected to the top plate of a bogey-mount for a steering motor.

Wheel spacing variations disclosed in U.S. Pat. Nos. 3,154,164, Shaw et al., and 3,236,324, Levratto, are provided by telescoping members supported by the frame and connected between laterally opposite wheels.

U.S. Pat. No. 4,029,165 discloses the use of a hydraulic cylinder for steering each wheel and U.S. Pat. No. 3,236,324 discloses linkage associated with a single hydraulic cylinder between the front and rear wheels.

DISCLOSURE OF INVENTION

The versatile self-propelled vehicle having a wide range of frame clearance and wheel spacing settings includes a frame; a wheel assembly at the front and rear on each side of the frame; lateral support assemblies connected between the front wheel assemblies and rear wheel assemblies and the frame to suspend the frame between the wheel assemblies; longitudinal stabilizing means connected between the front and rear wheel assemblies.

BRIEF DESCRIPTION OF DRAWINGS

The details of this invention will be described in connection with the accompanying drawings, in which:

FIG. 1 is a side elevation view of the vehicle with the frame in a lowered position;

FIG. 2 is a sectional view taken along lines 2—2 of FIG. 1;

FIG. 3 is an end view showing the frame in a raised position;

FIG. 4 is a top plan view of the lateral support assembly shown in FIG. 3;

FIG. 5 is a perspective view of the outer portion of the lateral support assembly;

FIG. 6 is a sectional view showing the spindle of the wheel assembly;

FIG. 7 is a side elevation view of a wheel assembly with the raised position of the collar and inner tubular member shown in phantom lines;

FIG. 8 is a sectional view taken along lines 8—8 of FIG. 7;

FIG. 9 is a sectional view taken along lines 9—9 of FIG. 7;

FIG. 10 is a side elevation view of the inner tubular member and elevator hydraulic cylinder for supporting and for raising and lowering the frame;

FIG. 11 is a side elevation view of a wheel assembly and a portion of a lateral support assembly;

FIG. 12 is a sectional view taken along lines 12—12 of FIG. 1;

FIG. 13 is a schematic diagram of the fluid power system;

FIG. 14 is a schematic hydraulic circuit diagram for the elevator hydraulic cylinders;

FIG. 15 is a schematic control circuit diagram for the bracing hydraulic cylinders;

FIG. 16 is a schematic diagram of the control circuit for the hydrostatic motors;

FIG. 17 is a top plan view showing the turning control and the turning mechanism in the straight-ahead position with the vehicle moving to the left; and FIG. 18 is a top plan view showing the wheels turned to turn the vehicle to the right.

DETAILED DESCRIPTION

The vehicle shown generally comprises a rectangular frame, four wheel assemblies 3, one each at the front and rear on each side of the frame, a lateral support assembly 4 connected between the front wheel assemblies and the frame and a similar lateral support assembly connected between the rear wheel assemblies and the frame, and a longitudinal stabilizer 5 connected between each of the front and rear wheel assemblies.

The frame 2 is generally rectangular and comprises a pair of laterally spaced longitudinal members 7 and spaced transverse members 8 connecting the longitudinal members together.

The frame is shown carrying an operator's cab 9 at the front forwardly of the front wheels, a power unit 11 at the rear, and a tank 12 for storing a fertilizer solution or the like between the cab and the power unit. The frame also carries other apparatus such as fuel and oil tanks and an oil cooler and filters and the like that are described more fully hereinafter.

Each wheel assembly 3 includes a wheel 14 having a rubber tire 15 and a rim 16, a wheel drive 17, a yoke 18 including an inside upright plate 19 extending along the inside of and up from the wheel, a top plate 21 and a top cover 22 extending over the wheel, a spindle 23 affixed to and extending up from the top plate, and an upright post 24 extending up from the top plate. The wheel 14, yoke 18, and spindle 23 are arranged to turn relative to the post about a vertical axis.

Each upright post 24 is comprised of two tubes 26 and 27 having a square cross section, spaced from one another and resting on a bottom plate 28 having a central opening 29. Box sidewalls 31 are secured to and extend below the bottom plate and are connected to a support arm 32 that rests on top plate 21 and extends along the vehicle.

Stiffeners 33 and 34 are affixed to and project from opposite front and rear sides of the tubes, respectively.

A top cap 35 secures the tops of the tubes together at their upper ends. The top cap has a central opening 37 through which an inner tubular member 123 secured to the collar 85 described hereinafter extends when the collars 85 are elevated.

As shown in FIG. 6, the spindle 23 includes a hollow stub shaft 38 affixed at its lower end to the top plate 21 so as to rotate therewith. The upper end of the hollow shaft has external threads 39 onto which there is threaded a nut 40. A flanged stub member 41 is secured to the top plate 21 by bolts 42 and extends up through the hollow stub shaft. The upper end of the stub member 41 above shaft 38 has an opening and serves as an elevator hydraulic cylinder mount through which a connector pin 43 extends to connect one end of the elevator hydraulic cylinder 127 thereto.

The hollow stub shaft 38 and flanged stub member 41 then extend up through openings in both the top plate 21 and the support arm 32. A sleeve 44 is affixed to the support arm 32 surrounding shaft 38 and a roller bearing 45 is disposed between the sleeve and the stub shaft 38 to permit the stub shaft to rotate inside the sleeve. A washer 46 is recessed in the sleeve 44 and held down by the nut 40. With this arrangement top plate 21, shaft 38, nut 40, and the rod of the elevator hydraulic cylinder 127 rotate together as the wheel is turned.

Each lateral support assembly 4, generally stated, includes an inner portion 51 and a pair of oppositely disposed outer portions 52 connected along the top and at the outer ends of the inner portion 51. Each outer portion 52 is movably connected to the inner portion 51 by a first set of two spaced parallel linkage bars 53 and 54 and a second set of two spaced parallel linkage bars 55 and 56 alined with the first set. Each linkage bar shown is comprised of a length of square tubing with a bushing 57 arranged transverse to and affixed to each end of the square tubing.

The upper ends of the first set of linkage bars 53 and 54 are pivotally mounted in spaced relation to one another between a set of two parallelly spaced plates 58 and 59. Each plate has a bushing 61 alined with the bushing 57 in the bar. A pivot shaft 62 extends through alined bushings in the plates 58 and 59 and the end bushing 57 in linkage bar 53 to support the linkage bar 53 for pivotal movement about an axis extending in the longitudinal direction of the vehicle. A pivot shaft 63 extends through alined bushings in plates 58 and 59 and the end bushing 57 in linkage bar 54 to support linkage bar 54 for pivotal movement.

Similarly, the upper ends of the second set of linkage bars 55 and 56 are pivotally mounted between a set of two parallelly spaced plates 65 and 66. Each plate 65 and 66 has a bushing 67 alined with the top bushing in the linkage bar. A pivot shaft 68 extends through alined bushings in the plates 65 and 66 and the end bushing in linkage bar 55 to support linkage bar 55 for pivotal movement. A pivot shaft 69 extends through alined bushings in plates 65 and 66 and the end bushing of linkage bar 56 to support linkage bar 56 for pivotal movement. The outer plates 59 and 66 extend down along the sides of the linkage bars and are connected along the lower inner and outer ends by connecting members 71, while a top plate 72 connects to the top edge of plates 58, 59, 65 and 66 to maintain the parallel relationship of the plates while supporting support the linkage bars. A further reinforcing member 70 extends along the bottom edges of the outer plates.

The lower end of linkage bar 53 has an end bushing 73 that is disposed in a channel 74 of the inner portion 51, the channel 74 carrying a bushing 75. A pivot shaft 76 extends through the end bushing 73 and bushing 75 of the channel to pivotally connect the outer portion 52 to inner portion 51.

Similarly, the lower end of linkage bar 54 has a lower end bushing 73 in the channel 74. A bushing 75 is carried in channel 74 and a pivot shaft 77 extends through the a alined bushings 73 and 75 to pivotally connect the lower end of outer portion 52 to the inner portion 51.

In a like manner the lower ends of linkage bars 55 and 56 are pivotally connected in a channel 74 by pivot shafts 81 and 82, respectively. Shaft 76 is alined with shaft 81 and shaft 77 is alined with shaft 82.

The outer end portions of the top plates extend beyond pivot shafts 63 and 69 and are pivotally connected to the inside of a collar 85 that slides up and down on an associated post 24. This pivotal connection shown includes a bushing 86 in plates 58 and 59 and a bushing 87 in plates 65 and 66.

A right-angle bracket 89 has one flange secured to the collar 85 and the other flange extending inwardly over webs 91 and 90. Web 90 extends between the plates 58 and 59 and web 91 extends between plates 65 and 66. The webs have apertures alined with bushings in the plates. A pivot shaft 92 extends through the bushings 86 and web 90 and a pivot shaft 93 alined with shaft 92 extends through bushing 87 and web 91 so that pivot shafts 92 and 93 form one pivotal connection between the collar and outer portion 52.

The inner portion 51 is comprised of a truss assembly that includes a front truss 95 and a rear truss 96 spaced from one another and connected front to rear by a top beam 97, an intermediate beam 98, and a bottom beam 99 to form a rectangular open framework. The truss further has converging beams 101 and 102 that extend toward one another from the lower ends of the front and rear trusses and are connected to a transversely extending center bottom beam 103.

The front and rear trusses are of an identical construction and, as viewed from the end, comprise a top horizontal member 105 from which channel 74 extends, laterally spaced vertical members 106 and 107 on opposite sides of the center line, and diagonal members 108 and 109 connected between the end of the top horizontal member and the opposite vertical members above the lower ends of the vertical members.

The frame 2 is resiliently connected to a lower portion of the lateral support assembly by a leaf spring 111 on each side of the lateral support assembly. The intermediate part of the leaf spring is affixed at the lower end or apex of diverging beams 101 and 102 on the bottom beam 103. The ends of the leaf spring are secured to upstanding channels 112 and 113 secured to the longitudinal member of the frame, as best seen in FIG. 11. This connecting of the frame to the bottom of the lateral support assembly 4 locates the bottom of the frame below the axis of rotation of the wheels 14 so the frame is moved to a relatively low clearance lowered position.

A pair of diagonal bracing members 115 shown as hydraulic cylinders is connected between the box sidewalls 31 at the bottom of the post and a diagonal support member 116 extending from the connection of the vertical member 106 and the horizontal member 105 of the truss to hold the wheel assembly in an upright position. The diagonal bracing members are shown to intersect at the longitudinal center line of the lateral support assembly 4.

Each collar 85 is comprised of a pair of parallel inner plates 121 and 122 between which there is sandwiched at the central position an inner tubular member 123 of square cross section. The inner tubular member 123 is affixed to the inner plates so as to move therewith. The spacing between the inner plates is selected in relation to the tubes 26 and 27 of the post 24 so as to slide up and down on the tubes.

Each inner plate has the center of the web of an outwardly facing end channel 125 affixed thereto. The flanges of adjacent end channels are spaced apart, leaving a gap for the stiffener of the post. An outer plate 126 is affixed to the outer flanges of opposite pairs of the channels 125. The inner plates 121 and 122, inner tubular member 123, and portions of the channels 125 thus form a rectangular socket around each of the tubes 26 and 27 of the post and the stiffeners 33 and 34 of the post extend through the gaps formed by the channels at opposite ends of the collar.

An elevator hydraulic cylinder 127 is shown in FIG. 10 as having the cylinder end connected by a pin 128 to the inside at the top of the inner tubular member 123 and the rod end to the spindle 23 by pin 42 above described. In this way the fluid in cylinder 127 supports the weight of the frame 2 and lateral support assembly and transmits this weight directly to the yoke to reduce or remove any friction between support arm 32 and top plate 21 during the turning of the wheels.

Each longitudinal stabilizer 5 is comprised of an upper connecting rod 131, diagonal connecting rods 132 and 133 that intersect one another, and a lower connecting rod 134. Each of these rods is connected to the inside stiffener 33 of the front and rear posts 24. As seen in FIG. 12, each end of each connecting rod is flexibly connected to the post using a universal coupling which includes mounting an arcuate female bearing portion 136 in a hole in the stiffener and connecting the ends of the stationary spherical male portion 137 of the coupling to the ends of two of the rods 131 and 133. A bolt 138 extends through the ends of the connecting rods and a hole in portion 137 for holding portion 137 of the bearing in place so that the ends of the connectors can flex relative to the stiffener. The longitudinal stabilizers function to prevent the front and rear wheel assemblies from tilting forward or backward.

The several parts of the vehicle adapted to be moved preferably are moved by the actuation of fluid motors connected in a fluid power system. These fluid motors are indicated collectively in block diagram form in FIG. 13 as wheel hydrostatic drives 17 and hydraulic cylinders 141. The power unit 11 or prime mover is a single diesel engine, shown as carried on the frame 2.

The engine 11 drives a variable volume hydraulic pump 142 which supplies fluid under pressure to the wheel hydrostatic drives 17 and a variable volume pressure-compensated pump 143 which supplies fluid under pressure over a pressure line P to all of the hydraulic cylinders 141. The hydraulic system includes a tank or oil reservoir 144 supplying oil through a strainer 145 and to each pump and return flow from drives 17 and cylinders 141 is passed from return line R through a filter 146 and back to the reservoir 144.

The control circuit for the elevator hydraulic cylinder 127 shown in FIG. 14 is arranged to automatically position the collar 85 and thereby the frame 2 to maintain the frame at a preset elevation. The control circuit has, in series, between pressure line P and the extend port of cylinder 127, a flow control valve 151, an electric solenoid operated control valve 152, and the IN port and one output port of a positive feedback control valve 153.

T-couplings 154 and 155 connect fluid flow from the IN port through a check valve 156 to the extend port of cylinder 127. The retract port of cylinder 127 is connected to the other output port of valve 153 and to valve 152 by a three-way shuttle valve 157. The return port designated "OUT" of valve 153 is connected back to the flow return line R.

The control valve 153 is positioned on collar 85. Valve 153 has an interior spool 158 that controls fluid flow to the outputs to each port of cylinder 127 according to its position. A spring 159 pushes the spool to one end. An exterior actuator arm 160 connected to the spool is urged by the spring against a stop 161 carried by the post 24.

The post carries a plate 162 with a plurality of apertures 163 arranged at vertically spaced intervals along the post to vary the setting for the stop 161. Bolts fasten the stop 161 to plate 162 at a selected position.

In operation, if the frame changes in elevation the actuator arm 160 is moved by stop 161. This causes a shift in the position of the spool from a centered position which in turn adjusts the fluid flow to the elevator hydraulic cylinder 127 to move the cylinder 127 to maintain the frame at a preset elevation.

A wheel spacing hydraulic cylinder 166 is connected between the inner portion 51 and the outer portion 52. In particular, as shown in FIGS. 3 and 4, one end of the cylinder 166 is pivotally secured to a bracket 167 at the center and top of the inner portion 51 and the other end is pivotally connected to a cross member 168 in the center and at the base of the outer portion 52. A control circuit with automatic positioning similar to that shown in FIG. 14 is used to control the movement of the wheel spacing hydraulic cylinder 3 to maintain each wheel assembly at a preset spacing.

A positive feedback control valve 171 similar to valve 153 above described is carried by the channel 74 of the inner portion 51 and is biased against a stop 172 carried along the bottom of the outer portion 52. For different positioning of the stop the outer portion also has a plate 173 with spaced apertures that permit the stop to be moved along the plate for different wheel width settings. Once the stop is set and the wheel spacing changes, the control valve 171 adjusts the flow to the wheel spacing cylinders 166 to maintain the preset wheel spacing.

The bracing hydraulic cylinder 115 is automatically adjusted to keep each wheel assembly straight up and down and specifically against any tendency to pivot side to side about pivot members 92 and 93.

The control circuit for the bracing hydraulic cylinder 115 shown in FIG. 15 includes a positive feedback control valve 177 similar to valve 153 with an interior spool 178 and an exterior actuator arm 179 moved by the spool, but the spool is not spring-biased. Control valve 177 is positioned on outer portion 52, as seen in FIG. 3, and has the exterior arm 179 physically connected to the collar 85.

The pressure line P is connected to the IN port and the return line to the OUT port of valve 177. The output ports of the valve are connected across the cylinder 115. Any movement of the wheel assembly from the right-angle position moves arm 179 to change the fluid flow in cylinder 115 to return the wheel assembly to the straight up and down or vertical position.

Each wheel drive, as shown in FIG. 3, is comprised of a planetary gear 181 and a hydrostatic motor 182, the shaft of the hydrostatic motor rotating the planetary gear and the planetary gear turning the wheel. A rim adapter plate 183 is bolted to the rim 16 of the wheel by bolts 184 and to the output of the gear 181 by bolts 185 so that, as the planetary gear rotates, the wheel rotates. The motor is supported by the upright plate 19 so that the housing of the motor 182 is stationary and the planetary gear housing 181 rotates the wheel rim.

Referring now to FIG. 16, each hydrostatic motor 182 of each wheel drive receives fluid pressure from the hydraulic pump 142 through a flow divider 187. The use of a flow divider maintains an equal flow to all wheel motors to prevent wheel spin-out. Flow line 188 connects fluid pressure to an inlet of each motor to simultaneously cause the motors to turn in one direction to move the vehicle forward. Flow line 189 is shown connecting pressure from pump 142 to the opposite inlet of each motor via the flow divider 187 to simultaneously turn the motors in the opposite direction to move the vehicle in reverse. A control lever at the pump 142 is used to vary the speed and direction of each motor as required. The control lever has a forward setting, a reverse setting and a neutral setting. The return line 191 connects to each motor and to an oil cooler 192 and then back to the oil reservoir 145.

Each wheel 14 is turned by the force provided by a turning hydraulic cylinder 194. Each turning hydraulic cylinder is supported by the support arm 32 carried by the lower end of the post, as above described. In particular, each support arm 32 has a circular end portion 195 centered on the vertical turning axis of the wheel 14, a flat horizontal arm portion 196 extending along the vehicle, a vertical gusset 197 along one edge of the arm portion, and a channel-shaped cylinder mount 198 turned on its side outside the gusset.

The turning hydraulic cylinder 194 is connected between the cylinder mount 198 and has a male coupling 199 that is inserted into an opening or socket in the yoke top plate 21 located a selected distance to one side of the turning axis. As the turning hydraulic cylinder 194 is actuated, each wheel is turned by the application of a turning force to the top plate 21 to one side and above the wheel.

A tie rod 201 has a male coupling 202 on each end that inserts into a socket in the top plate 21 opposite the male coupling 199 the same selected distance from the vertical turning axis of the wheel. A tie rod 201 on the right side of the vehicle is connected to the associated tie rod mount at the inner side of the right front wheel and the outer side of the right rear wheel. The tie rod 201 is connected between the inside of the left front wheel and the outer side of the left rear wheel. In this way the rear wheel is synchronized with and follows and tracks with the associated front wheel on the same side of the vehicle.

The turning cylinders 194 for the front wheels are along the outside of the front wheels while those for the rear wheels are along the inside of the rear wheels.

For turning right, as illustrated in FIG. 18, the right front turning cylinder is pulled and the right rear cylinder is pushed, while the left front turning cylinder is pushed and the right rear cylinder is pulled.

The hydraulic control circuit illustrated in FIG. 17 for accomplishing this power steering has the pressure line P connected through a flow control valve 202 (7 gpm) and a steering-wheel-controlled valve 203 by a line 204 to the push sides of the left front and right rear turning cylinders and the opposite pressure line 205 is connected to the right front and left rear turning cylinders.

The operation of the front wheel turning cylinders is hydraulically synchronized to turn together and the operation of the rear wheel turning cylinders is hydraulically synchronized to turn together. This is accomplished by having a line 206 connecting the retract ends of the front cylinders together so that a constant volume of fluid is maintained on the retract side of the respective pair of pistons and a line 207 connecting the retract ends of the rear wheel cylinders together.

In the event the laterally opposite turning cylinders become out of synchronization, the wheel turning cylinder has a passage through the piston with a normally closed poppet valve controlling the fluid flow from one side of the piston to the other through the passage. A rod is connected to the push end inside the cylinder so that, when the piston is moved to the retracted end, it trips the valve and an equal amount of fluid is passed to the retract sides of the piston and the wheel is again turned the same amount.

OPERATION

In the operation of the above apparatus the operator controls are located in the cab 9. The vehicle is moved forward or backward by the actuation of a control lever operatively associated with pump 142. During vehicle movement the wheel spacing is changed by actuating a control valve 152, seen in FIG. 14, that in turn controls fluid to positive feedback valve 171 that selectively extends or retracts the wheel spacing cylinder 166. In short, control valve 152 is operator actuated and valve 171 operates automatically in response to the movement of associated parts of the machine. The frame is raised or lowered by actuating control valve 152, seen in FIG. 14, that controls the fluid to positive feedback control valve 153 that selectively extends or retracts the elevator hydraulic cylinders 127. The wheels are turned by turning a steering wheel associated with control 203.

By way of illustration only, there are listed below devices which have been found suitable for use in the illustrated apparatus:

| Device | Rating | Model No. | Manufacturer |
| --- | --- | --- | --- |
| Hydrostatic motor 182 | | 18-4015 | Sundstrand |
| Planetary gear 181 | 31 to 1 | | Borg Warner |
| Power unit 11 | 95 hp | 4276 TF | John Deere |
| Variable volume pump 142 | 5000 psi 5.43 cubic in. displ. per rev. | 23-2058 | Sundstrand Hydrostatic transmission |
| Variable volume pressure compensated pump 143 | 40 gal. per min. | PR 40 | John Deere |
| Turning cylinder 194 | 2400 psi | 37755-1 | Garrison |
| Steering wheel control 203 | 6 gal. | 19AF-2 | Hydraguide |
| Flow control valve 151 | 3000 psi | FR1A-15-H4P-A | Snap-tite |
| Positive feedback control valve 153, | 3000 psi | C4N50 | Brand Hydraulics |

| Device | Rating | Model No. | Manufacturer |
|--------|--------|-----------|--------------|
| 177 | | | |

By way of example and not by way of limitation, a vehicle constructed in accordance with the present invention suitable for spraying crops has the following dimensions:

Maximum clearance for frame 6 ft.
Minimum clearance for frame 2 ft.
Maximum spacing for wheels 10 ft. 2 in. center to center
Minimum spacing for wheels 8 ft. center to center
Diameter of wheels 5 ft. overall Although the present invention has been described with a certain degree of particularity, it is understood that the present disclosure has been made by way of example and that changes in details of structure may be made without departing from the spirit thereof.

What is claimed is:

1. In a vehicle, the combination comprising:
   a frame;
   a wheel assembly at the front and rear on each side of said frame, each said wheel assembly including a wheel, a yoke mounted on the wheel, and a post extending up from the top of said yoke; and
   lateral support means connected between the front wheel assemblies and said frame and connected between the rear wheel assemblies and said frame to suspend said frame between said wheel assemblies,
   said lateral support means including an inner portion and a pair of oppositely disposed outer portions for each of said front wheel assemblies and said rear wheel assemblies, each pair of outer portions being movable laterally with respect to the associated inner portion to vary the spacing between opposite wheels,
   each said wheel assembly being pivotally connected to an upper outer end portion of an adjacent one of said outer portions at an upper pivot and having a bracing means including a pair of variable length bracing members extending from opposite positions on said lateral support means to connect with the yoke of an associated wheel assembly and movable in response to a change in position of said outer portions for holding said wheel assembly substantially vertical each time the spacing between opposite wheels changes.

2. In a vehicle as set forth in claim 1 wherein each bracing member includes a fluid cylinder to support said frame from each said wheel assembly through the fluid in each said cylinder.

3. In a vehicle as set forth in claim 1 including a resilient coupling means connecting a lower portion of said lateral support means to said frame.

4. In a vehicle as set forth in claim 3 wherein said resilient coupling means includes a leaf spring having an intermediate portion connected to the bottom of an associated wheel assembly and end portions connected to the frame.

5. In a vehicle as set forth in claim 1 including a collar slidable up and down on each post, said collar being pivotally connected to said lateral support means at said upper pivot.

6. In a vehicle as set forth in claim 5 wherein said collar includes inside parallel plates, an end channel connected to the end of each of said plates, each end channel having a pair of outer flanges and parallel outer plates parallel to said inner plates, each outer plate connected to one of the outer flanges of each of said channels.

7. In a vehicle as set forth in claim 6 including an elevator hydraulic cylinder connected between each yoke and an associated collar arranged to move said frame between a top position and a bottom position.

8. In a vehicle as set forth in claim 1 wherein said yoke includes a side plate and at least one top plate extending over the wheel, there being a spindle assembly including a spindle affixed to and extending up through said top plate,
   said post having a sleeve surrounding said spindle and a bearing between said spindle and sleeve, whereby said side and top plates and spindle are free to rotate relative to said sleeve about a vertical axis to turn the vehicle.

9. In a vehicle as set forth in claim 1 wherein said post includes two upright tubular members spaced from one another and resting on a bottom plate having a central opening, a top cap connecting said upright tubular members, sidewalls extending down from said bottom plate forming a box, and a support arm disposed on said top plate and forming the bottom of said box.

10. In a vehicle as set forth in claim 1 wherein said lateral support means includes an inner portion and a pair of oppositely disposed outer portions connected along the top of said inner portion, each outer portion being connected to said inner portion by at least one pair of parallel linkage bars pivotally connected at their upper ends to an associated outer portion and pivotally connected at their lower ends to said inner portion to form a parallelogram-type structure, whereby each outer portion is movable laterally with respect to said inner portion as said linkage bars pivot about their upper ends.

11. In a vehicle as set forth in claim 10 including a wheel spacing hydraulic cylinder connected between said inner portion and each outer portion to vary the lateral position of each outer portion relative to said inner portion.

12. In a vehicle as set forth in claim 1 wherein the bottom of said frame is below the axis of rotation of said wheels in the lowest position for said frame.

13. In a vehicle as set forth in claim 1 further including:
   longitudinal stabilizing means connected between the posts of said front and rear wheel assemblies on each side of the frame.

14. In a vehicle as set forth in claim 13 wherein said longitudinal stabilizing means includes diagonal members and horizontal members connected between the front and rear posts of associated said wheel assemblies.

15. In a vehicle as set forth in claim 14 including universal coupling means between the ends of said diagonal members and horizontal members and said posts to provide universal flexure between the front and rear wheel assemblies.

16. In a vehicle as set forth in claim 1 including a drive mounted to each wheel rim to rotate said wheels.

17. In a vehicle as set forth in claim 16 including control means to control the direction and speed of each motor.

18. In a vehicle as set forth in claim 1 including tie rods connected between each of the front and rear wheels to synchronize the movement steering between the front and rear wheels on each side, and hydraulic synchronizing means between laterally opposite wheel assemblies to synchronize the movement between the front wheels and to synchronize the movement between the rear wheels.

19. In a vehicle as set forth in claim 1 including wheel turning hydraulic cylinders supported by each post arranged to turn each wheel from side to side.

20. In a self-propelled vehicle having variable clearance and variable wheel spacing, the combination comprising:
a generally rectangular frame including a pair of spaced longitudinal members connected together by spaced transverse members;
a wheel assembly at the front and rear on each side of said frame, each said wheel assembly including a wheel, a yoke mounted on the wheel, a spindle extending up from said yoke, and a post extending up from the top of said yoke around said spindle, said wheel, yoke and spindle being rotatable relative to said post about a vertical axis;
an operator's cab on the frame forwardly of said front wheels;
a lateral support assembly connected between the front wheel assembly and a lateral support assembly connected between the rear wheel assembly, each said connection including a collar slidable up and down on each post, each collar being pivotally connected to an associated lateral support assembly at an upper pivot, and further including cross bracing means with a bracing hydraulic cylinder extending from said lateral support means to an associated wheel assembly between an associated upper pivot and an associated post above the wheel,
said lateral support assemblies being connected by a resilient coupling to said frame to resiliently suspend said frame between said wheel assemblies,
each lateral support assembly including an inner portion and a pair of oppositely disposed outer portions connected above the top of said inner portion, each outer portion being connected to said inner portion via at least one pair of parallel linkage bars to form a parallelogram-type structure;
longitudinal stabilizing means including connecting rods having universal couplings connected to the post on each side of said frame to flexibly hold said wheel assemblies against forward and rearward tilting movement;
an elevator hydraulic cylinder connected between each spindle and each associated collar;
control means to selectively actuate said elevator hydraulic cylinders to raise and lower said frame between a bottom position and a top position with an automatic position control to maintain the frame at a preset elevation;
a wheel spacing hydraulic cylinder connected between said inner portion and each outer portion to move said outer portions laterally with respect to said inner portion;
control means to selectively actuate said wheel spacing hydraulic cylinders to change the spacing between laterally opposite wheels and having an automatic position control to maintain the wheels at a preset spacing;
automatic position control means for said bracing hydraulic cylinders to maintain said wheel assemblies upright;
controlled drive means to rotate said wheels to move said vehicle; and
controlled drive means to turn said wheels about a vertical axis with a circuit to synchronize the movement between laterally opposite wheels and a front-to-rear linkage between the wheel assemblies to synchronize the movement between the front and rear wheels for steering said vehicle.

21. In a vehicle, the combination comprising:
a frame;
a wheel assembly at the front and rear on each side of said frame, each said wheel assembly including a wheel, a yoke mounted on the wheel, and a post extending up from the top of said yoke; and
lateral support means connected between the front wheel assemblies and said frame and connected between the rear wheel assemblies and said frame to suspend said frame between said wheel assemblies,
each said wheel assembly being pivotally connected to an upper outer end portion of said lateral support means at an upper pivot and having a bracing means including a pair of bracing members extending from opposite positions on said lateral support means to connect with the yoke of an associated wheel assembly for holding said wheel assembly upright,
a collar slidable up and down on each post, said collar being pivotally connected to said lateral support means at said upper pivot,
said collar including inside parallel plates, an end channel connected to the end of each of said plates, and an outer plate parallel to said inner plates connected to the outer flanges of said channels,
an elevator hydraulic cylinder connected between each yoke and an associated collar arranged to move said frame between a top position and a bottom position, and
automatic position control means for said frame including a control circuit with a control valve positioned on each post, said control valve having an interior spool that controls fluid flow to said elevator hydraulic cylinder and an exterior actuator arm moved by said spool, said actuator arm being positioned against a stop carried by an associated collar, whereby movement of the frame to a different elevation causes the actuator arm to move so that the control valve changes the fluid flow in the elevator cylinder so as to maintain the frame at a preselected elevation.

22. In a vehicle, the combination comprising:
a frame;
a wheel assembly at the front and rear on each side of said frame, each said wheel assembly including a wheel, a yoke mounted on the wheel, and a post extending up from the top of said yoke; and
lateral support means connected between the front wheel assemblies and said frame and connected between the rear wheel assemblies and said frame to suspend said frame between said wheel assemblies,
each said wheel assembly being pivotally connected to an upper outer end portion of said lateral support means at an upper pivot and having a bracing means including a pair of bracing members extending from opposite positions on said lateral support means to connect with the yoke of an associated wheel assembly for holding said wheel assembly upright, said lateral support means including an inner portion and a pair of oppositely disposed outer portions connected along the top of said inner portion, each outer portion being connected to said inner portion by at least one pair of parallel linkage bars pivotally connected at their upper ends to an associated outer portion and pivotally connected at their lower ends to said inner portion to form a parallelogram-type structure, whereby each outer portion is movable laterally with respect to said inner portion as said linkage bars pivot about their upper ends, and said inner portion being a truss assembly comprised of a front truss and a rear truss connected by longitudinally extending connecting members, each said truss including a top member, depending vertical members on each side of a center line, and a bottom member.

23. In a vehicle, the combination comprising:

a frame;

a wheel assembly at the front and rear on each side of said frame, each said wheel assembly including a wheel, a yoke mounted on the wheel, and a post extending up from the top of said yoke; and lateral support means connected between the front wheel assemblies and said frame and connected between the rear wheel assemblies and said frame to suspend said frame between said wheel assemblies;

each said wheel assembly being pivotally connected to an upper outer end portion of said lateral support means at an upper pivot and having a bracing means including a pair of bracing members extending from opposite positions on said lateral support means to connect with the yoke of an associated wheel assembly for holding said wheel assembly upright, said lateral support means including an inner portion and a pair of oppositely disposed outer portions connected along the top of said inner portion, each outer portion being connected to said inner portion by at least one pair of parallel linkage bars pivotally connected at their upper ends to an associated outer portion and pivotally connected at their lower ends to said inner portion to form a parallelogram-type structure, whereby each outer portion is movable laterally with respect to said inner portion as said linkage bars pivot about their upper ends, and said outer portion including parallel plates on both sides of each linkage bar supporting said linkage bars for rotation and holding said linkage bars against twisting about the pivot axis for the linkage bars.

24. In a vehicle, the combination comprising:

a frame;

a wheel assembly at the front and rear on each side of said frame, each said wheel assembly including a wheel, a yoke mounted on the wheel, and a post extending up from the top of said yoke; and lateral support means connected between the front wheel assemblies and said frame and connected between the rear wheel assemblies and said frame to suspend said frame between said wheel assemblies, each said wheel assembly being pivotally connected to an upper outer end portion of said lateral support means at an upper pivot and having a bracing means including a pair of bracing members extending from opposite positions on said lateral support means to connect with the yoke of an associated wheel assembly for holding said wheel assembly upright, said lateral support means including an inner portion and a pair of oppositely disposed outer portions connected along the top of said inner portion, each outer portion being connected to said inner portion by at least one pair of parallel linkage bars pivotally connected at their upper ends to an associated outer portion and pivotally connected at their lower ends to said inner portion to form a parallelogram-type structure, whereby each outer portion is movable laterally with respect to said inner portion as said linkage bars pivot about their upper ends, a wheel spacing hydraulic cylinder connected between said inner portion and each outer portion to vary the lateral position of each outer portion relative to said inner portion, automatic position control means for each wheel spacing hydraulic cylinder including a control circuit with a control valve positioned on said inner support portion, said control valve having an interior spool arranged to control fluid flow to said wheel spacing hydraulic cylinder and an exterior actuator arm moved by said spool, said actuator arm being positioned against a stop carried by said outer portion, said spool being braced to move said actuator arm against the stop for a preset wheel spacing, and whereby movement of the spool in the wheel spacing cylinder due to a change in the wheel spacing results in a change in the fluid flow from the control valve to the hydraulic cylinder so as to maintain each wheel assembly at a preset wheel spacing.

25. In a vehicle, the combination comprising:

a frame;

a wheel assembly at the front and rear on each side of said frame, each said wheel assembly including a wheel, a yoke mounted on the wheel, and a post extending up from the top of said yoke; and lateral support means connected between the front wheel assemblies and said frame and connected between the rear wheel assemblies and said frame to suspend said frame between said wheel assemblies, each said wheel assembly being pivotally connected to an upper outer end portion of said lateral support means at an upper pivot and having a bracing means including a pair of bracing members extending from opposite positions on said lateral support means to connect with the yoke of an associated wheel assembly for holding said wheel assembly upright, and said bracing member including a hydraulic cylinder and further including an automatic positioning control means for each hydraulic cylinder including a control circuit with control valve, said control valve having an interior spool arranged to control fluid flow to said hydraulic cylinder and an exterior actuator arm moved by said spool, each control valve being supported by said lateral support means and having its actuator arm connected to an associated wheel assembly for sensing any angular movement of the associated wheel assembly about the associated upper pivot from a right angle relationship to adjust the fluid flow to the associated cylinder in response to any angular change of said wheel assembly from an upright position to adjust the position of the spool to return each wheel assembly to the upright position.

* * * * *